(12) United States Patent
Rau (10) Patent No.: US 7,364,008 B2
(45) Date of Patent: Apr. 29, 2008

(54) SYSTEM FOR IMPARTING MECHANICAL IMPULSE ENERGY TO THE GROUND

(75) Inventor: John Wayne Rau, Vulcan (CA)

(73) Assignee: 969912 Alberta Ltd., Calgary, Alberta (CA)

( * ) Notice: Subject to any disclaimer, the term of this patent is extended or adjusted under 35 U.S.C. 154(b) by 167 days.

(21) Appl. No.: 10/845,106

(22) Filed: May 14, 2004

(65) Prior Publication Data

US 2005/0252711 A1 Nov. 17, 2005

(51) Int. Cl.
*G01V 1/147* (2006.01)
*G01V 1/04* (2006.01)

(52) U.S. Cl. ............. 181/121; 181/108; 181/113; 181/114; 367/189; 367/190

(58) Field of Classification Search ........... 181/121, 181/108, 113, 114; 367/189, 190
See application file for complete search history.

(56) References Cited

U.S. PATENT DOCUMENTS

| | | | |
|---|---|---|---|
| 3,557,900 A | 1/1971 | Kilmer | |
| 3,905,446 A | 9/1975 | Ross | |
| 4,011,923 A | 3/1977 | Talke et al. | |
| 4,108,271 A | 8/1978 | Chelminski | |
| 4,114,722 A | 9/1978 | Weber et al. | |
| 4,116,300 A | 9/1978 | Stone | |
| 4,118,994 A | 10/1978 | Layotte et al. | |
| 4,135,598 A | 1/1979 | Stafford | |
| 4,271,923 A | 6/1981 | Layotte et al. | |
| 4,316,521 A | 2/1982 | Chelminski | |
| 4,341,282 A | 7/1982 | Bird | |
| 4,388,981 A * | 6/1983 | Fair | 181/119 |
| 4,390,077 A * | 6/1983 | Fulkerson | 181/121 |
| 4,402,381 A | 9/1983 | Airhart | |
| 4,492,285 A | 1/1985 | Fair et al. | |
| 4,700,804 A * | 10/1987 | Trudeau | 181/121 |
| 4,770,269 A * | 9/1988 | Woodrow | 181/121 |
| 4,799,572 A * | 1/1989 | Airhart | 181/114 |
| 4,959,818 A * | 9/1990 | Cole | 367/189 |
| 5,000,285 A * | 3/1991 | Airhart | 181/113 |
| 5,018,598 A * | 5/1991 | Sodich | 181/106 |
| 5,229,554 A * | 7/1993 | Cole | 181/106 |
| 5,401,919 A * | 3/1995 | Crowell et al. | 181/121 |
| 5,666,328 A * | 9/1997 | Crowell et al. | 367/189 |
| 5,967,297 A * | 10/1999 | Kaufman et al. | 200/241 |
| 6,065,562 A | 5/2000 | Bird et al. | |
| 6,460,803 B1 * | 10/2002 | Kiss et al. | 244/54 |

* cited by examiner

*Primary Examiner*—Lincoln Donovan
*Assistant Examiner*—Jeremy Luks
(74) *Attorney, Agent, or Firm*—Birch, Stewart, Kolasch & Birch, LLP (57) ABSTRACT

The invention relates to an apparatus and method for imparting a precise amount of impulse energy to be delivered to the ground. The apparatus includes an anvil for operative deployment against the earth a hammer operatively connected to the anvil for striking the anvil; and a control system operatively connected to the hammer for controlling the impulse energy of the hammer striking the anvil. The control system includes a linear feedback system for measuring the linear position of the hammer with respect to the anvil during a force stroke and a processor for receiving linear position data from the linear feedback system for controlling the relative speed of the hammer with respect to the anvil during a force stroke through an actuation system.

19 Claims, 6 Drawing Sheets

SYSTEM FOR IMPARTING MECHANICAL IMPULSE ENERGY TO THE GROUND

FIELD OF THE INVENTION

The invention relates to an apparatus and method for imparting a precise amount of impulse energy to be delivered to the ground.

BACKGROUND OF THE INVENTION

In the oil exploration industry, seismic data is obtained to enable scientists and engineers to develop a picture of underlying rock formations. The reflection seismic method attempts to image the top few kilometres of the earth's crust by artificially creating a wavefield at the earth's surface and then recording this wavefield at multiple locations as it returns to the surface via reflections from the rock layers of the earth's crust. These wavefields are then processed in order to obtain images of the subsurface that can be used to help locate hydrocarbons or other minerals. In order to obtain this data, a wavefield is created at the surface at a source location by setting off a percussive shock wave that imparts wave energy into the ground. The source is typically an explosive charge, Vibrator sinusoidal wave or a mechanical impulse system. A Vibrator creates a sinusoidal signal of changing frequency through shaking the earth, whereas an impulse or explosive source creates a single multiple frequency shock wave that travels into the earth.

A series of receivers (geophones) located at previously surveyed points are set up to record the amplitude of wave energy reflected to each receiver point from underlying formations as a function of time, thus creating an array of time/amplitude data sets from each geophone array.

As noted, shock waves can be imparted to the ground by either explosive or mechanical systems. While explosive systems can generate shock waves of a greater magnitude, there are many disadvantages in using explosives both in terms of regulations and efficiency. Thus, mechanical impulse systems are desirable due to: low deployment cost, high resolution data created by a greater number of source locations, increased safety and low environmental impact.

In the past, however, mechanical shock wave generators have been disadvantaged in that the amount of impulse energy imparted to the ground cannot be accurately controlled thus leading to increased error margins in the interpretation of the collected seismic data. Thus, there has been a need for a mechanical impulse system that is capable of precisely controlling the amount of impulse energy for a given source location.

A review of the prior art reveals that a system that enables a precise amount of energy to be delivered to the ground has not yet been deployed.

For example, U.S. Pat. No. 4,271,923, U.S. Pat. No. 4,402,381 U.S. Pat. No. 3,905,446, U.S. Pat. No. 4,118,994 and U.S. Pat. 4,316,521 describe hammer/anvil pulse generator systems. However, none of these patents describe the use of a hydraulic actuation and control systems that provides linear velocity and position feedback to ensure that a repeatable output of energy is delivered to the earth.

U.S. Pat. Nos. 4,341,282, 4,011,923, 4,114,722, 4,135,598, 4,116,300, 5,666,328, 6,065,562 and U.S. Pat. No. 4,492,285 each describe pulse generator that utilizing a vibrating energy source, U.S. Pat. No. 4,108,271 describes a pulse generator that releases pressurize gas to impart energy to the ground that does not utilize a hydraulic actuation and control system that provides linear velocity and position feedback to ensure that a repeatable output of energy is delivered to the earth. U.S. Pat. No. 3,557,900 describes a pulse generator that utilizes a chemical combustion process.

SUMMARY OF THE INVENTION

In accordance with the invention, there is provided a system for imparting a mechanical impulse to the earth comprising:
  an anvil for operative deployment against the earth;
  a hammer operatively connected to the anvil for striking the anvil;
  a control system operatively connected to the hammer for controlling the impulse energy of the hammer striking the anvil, the control system including a linear feedback system for measuring the linear position of the hammer with respect to the anvil during a force stroke, a processor for receiving linear position data from the linear feedback system and for controlling the relative speed of the hammer with respect to the anvil during a force stroke through an actuation system.

In accordance with a further embodiment of the invention, the control system includes:
  a hydraulic actuator operatively connected to the hammer, the hydraulic actuator having a retract side and a pressure side;
  a hydraulic reservoir and hydraulic pump operatively connected to the retract side of the hydraulic actuator, the hydraulic pump for pumping hydraulic fluid from the hydraulic reservoir to the hydraulic actuator;
  a hydraulic accumulator operatively connected to the pressure side of the hydraulic actuator, the hydraulic accumulator having a pressure system for storing hydraulic energy on the pressure side of the hydraulic actuator; and,
  a linear transducer operatively connected to the hammer for measuring the linear position of the hammer with respect to the anvil;
  wherein the actuation system is operatively connected between the hydraulic pump and the retract side of the hydraulic piston.

In yet another embodiment, the invention provides a system for imparting a mechanical impulse to the earth comprising:
  an anvil/platen/base plate assembly for operative deployment against the earth;
  a hammer and mass assembly operatively connected to the anvil, the hammer/mass assembly for striking the anvil;
  a control system including a servo valve, hydraulic actuator and accumulator assembly interconnected to the hammer/mass assembly for controlling the impulse energy of the hammer/mass assembly striking the anvil/platen/base plate assembly, the control system including a linear feedback loop for measuring the linear velocity and position of the hammer with respect to the anvil during a force stroke, a processor for receiving linear velocity and position data from the linear feedback loop and a proportional integrated derivative (PID) control loop to measure and correct the velocity of the hammer/mass velocity with respect to the anvil during a force stroke.

In a still further embodiment, the control system includes:
  a hydraulic actuator operatively connected to the hammer and mass assembly, the hydraulic actuator having a pressure side and a retract side;

a hydraulic reservoir and first and second hydraulic pumps, the first hydraulic pump operatively connected through a servo control valve to the retract side of the hydraulic actuator, the hydraulic pump for pumping hydraulic fluid from the hydraulic reservoir to the retract side and the second hydraulic pump for pumping hydraulic fluid to the pressure side;

a hydraulic accumulator operatively connected to the pressure side of the hydraulic actuator, the hydraulic accumulator having a pressure system for storing energy from the hydraulic actuator when hydraulic fluid is pumped to the pressure side of the hydraulic actuator; and, a linear transducer operatively connected to the hammer for measuring the linear velocity and position of the hammer with respect to the anvil;

wherein the actuation system is operatively connected between the hydraulic pump and the retract side of the hydraulic accumulator.

BRIEF DESCRIPTION OF THE DRAWINGS

The invention is described with reference to the following drawings wherein.

DETAILED DESCRIPTION OF THE INVENTION

With reference to the figures, an impulse system 8 and impulse system assembly for providing mechanical impulse (seismic impulse) energy to the ground 9 is described. The system 8 generally includes a mass/hammer and anvil/baseplate assembly 10 and a hydraulic actuation system 12 (HAS) configurable to a carrier such as a vehicle 9a or a trailer (not shown). In operation, during a seismic survey, the system 8 is transported to a location where a seismic impulse is required and the system is deployed and operated to impart a mechanical shock wave to the earth at multiple source locations and recorded for scientific interpretation.

Mass/Hammer and Anvil/Baseplate Assembly 10

The mass/hammer and baseplate assembly 10 includes a mass assembly 10a connected to a hammer 10b that is used to strike an anvil 10c. The anvil 10c is mated to a base plate 10e, through the intermediate plate 10d and forced against the earth 9 by a hydraulically actuated hold down system 100 (FIG. 3A). As the anvil 10c is struck by the hammer 10b, impulse energy is imparted to the earth 9 through the base plate 10e. In a preferred embodiment, the anvil 10c includes a convex surface 10f that is engaged against a corresponding concave surface in a platen plate 10g of the baseplate 10e which enables concentrated impulse energy to be imparted into uneven terrain. The mass assembly 10a is mechanically attached to the hydraulic actuation system 12 through a gimble 10d.

Hydraulic Actuation System 12

The Hydraulic Actuation System (HAS 12) operates to control the linear movement of the mass assembly 10a against the anvil 10c during a force stroke and the linear movement of the mass assembly 10a away from the anvil 10c during a retraction stroke as well as charging and discharging of hydraulic accumulators 12d using hydraulic fluid.

The HAS 12 generally includes a hydraulic reservoir 12a, hydraulic pumps 12b, 12b', a hydraulic actuator 12c, hydraulic accumulators 12d having a gas-filled bladder 12e, a charge valve 12x, a discharge valve 12y, an actuation valve 12f (preferably a servo valve), a linear transducer 12h and proportional integrated derivative (PID) control electronics 12g.

In operation, during the retraction stroke, hydraulic fluid is pumped by pump 12b from the reservoir 12a through the actuation valve 12f to the hydraulic actuator 12c which causes the actuator 12c to retract thus lifting the mass and hammer to a set position above the anvil. The actuation valve 12f is closed and the mass and hammer are held in the set position. The accumulators 12d are then charged by pumping hydraulic fluid from the hydraulic reservoir 12a through charge valve 12x into each hydraulic accumulator 12d against the gas-filled bladder 12e. During the charge cycle, charge valve 12x is opened and discharge valve 12y is closed. Upon reaching a predetermined charge pressure, as measured by pressure transmitter 12z, the charge valve 12x is closed and the system is ready to fire.

Upon triggering the force stroke, the potential energy stored within the accumulators 12d is converted to kinetic energy by opening the actuation valve 12f enabling the compressed bladder 12e to cause movement of the hydraulic fluid back through the servo valve into the hydraulic reservoir 12a through port 12i, thereby causing movement of the mass assembly 10a towards the anvil 10c. As the oil is forcing the hydraulic actuator 12c and mass assembly toward the anvil, the oil flow is metered and provides input to the control system 12g to control the velocity of the mass assembly 10a. In addition, during the force stroke, the linear transducer 12h provides linear velocity and position data to the control electronics 12g which uses the linear velocity and position data in conjunction with a PID loop to determine and control the desired speed (and hence energy output) of the impulse system 8.

Once the force stroke is complete, the discharge valve 12y is opened and any remaining oil within the accumulator 12d is re-cycled back to the reservoir 12a by any remaining stored energy in the hydraulic accumulator. It is preferred to that hydraulic oil is re-cycled back to the reservoir to ensure appropriate heat dissipation from the hydraulic oil during the charge/discharge cycle so as maintain stable temperatures within the system.

The linear transducer produces a velocity signal by measuring the change in position over time and creates a voltage output proportional to the rate of change. By recalling predetermined system parameters from a digital library, the actuator stroke, the actuator/mass assembly velocity, or both, can be tailored to produce predetermined force outputs. Precise force outputs can then be delivered at specific source locations during a seismic survey based on resolution requirements for that particular area.

Furthermore, using the linear transducer and the PID loop to control the speed accurately, it is possible to deploy more than one impulse assembly 8 in the field whereby each can be synchronized to produce one summed output timed to occur simultaneously. As a result, the system enables accurate and repeatable force output for application to a wide variety of practical circumstances.

Testing from the prototype carried out by and certified by Verifi Inc. (United Kingdom) has resulted in the output in excess of 860,000 lbsf being delivered to the base plate carried out during field testing, with 1000 psi accumulator charge pressure and 22 in of mass stroke.

Figure 2:
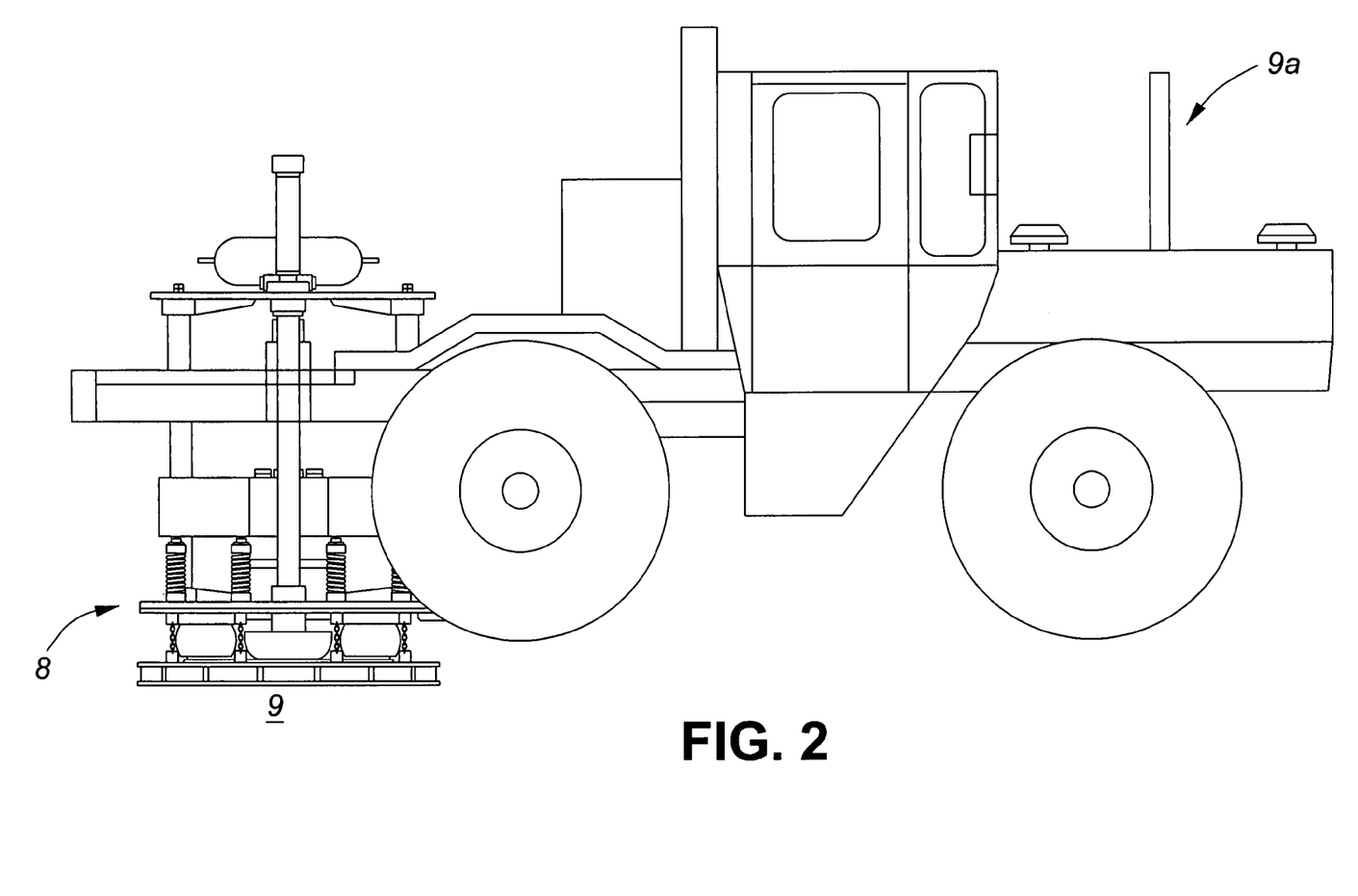
FIG. 2 is a side view of one embodiment of an impulse system in accordance with the invention installed on a vehicle.
Figure 2A:
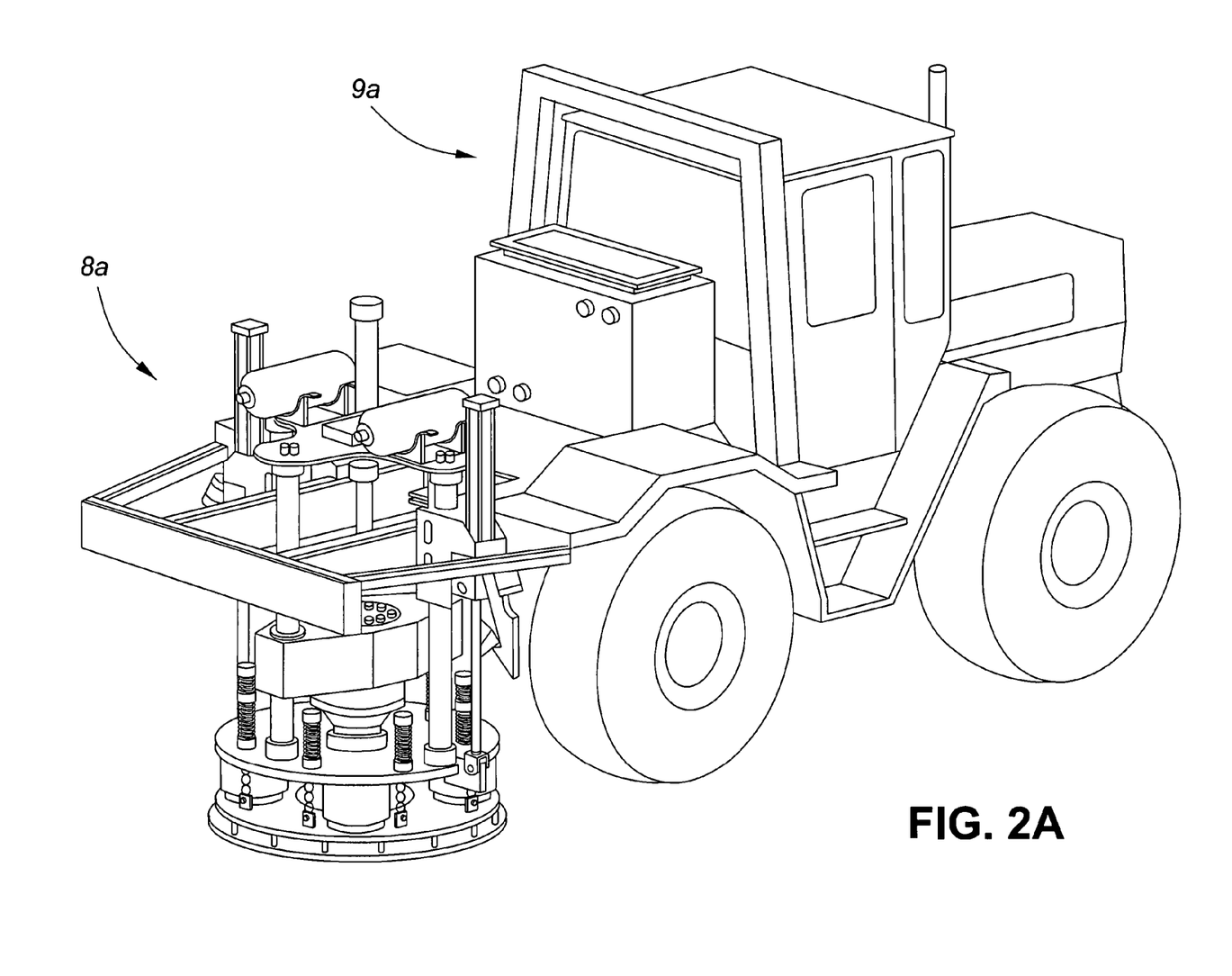
FIG. 2A is an isometric view of one embodiment of an impulse system in accordance with the invention installed on a vehicle.
Figure 3:
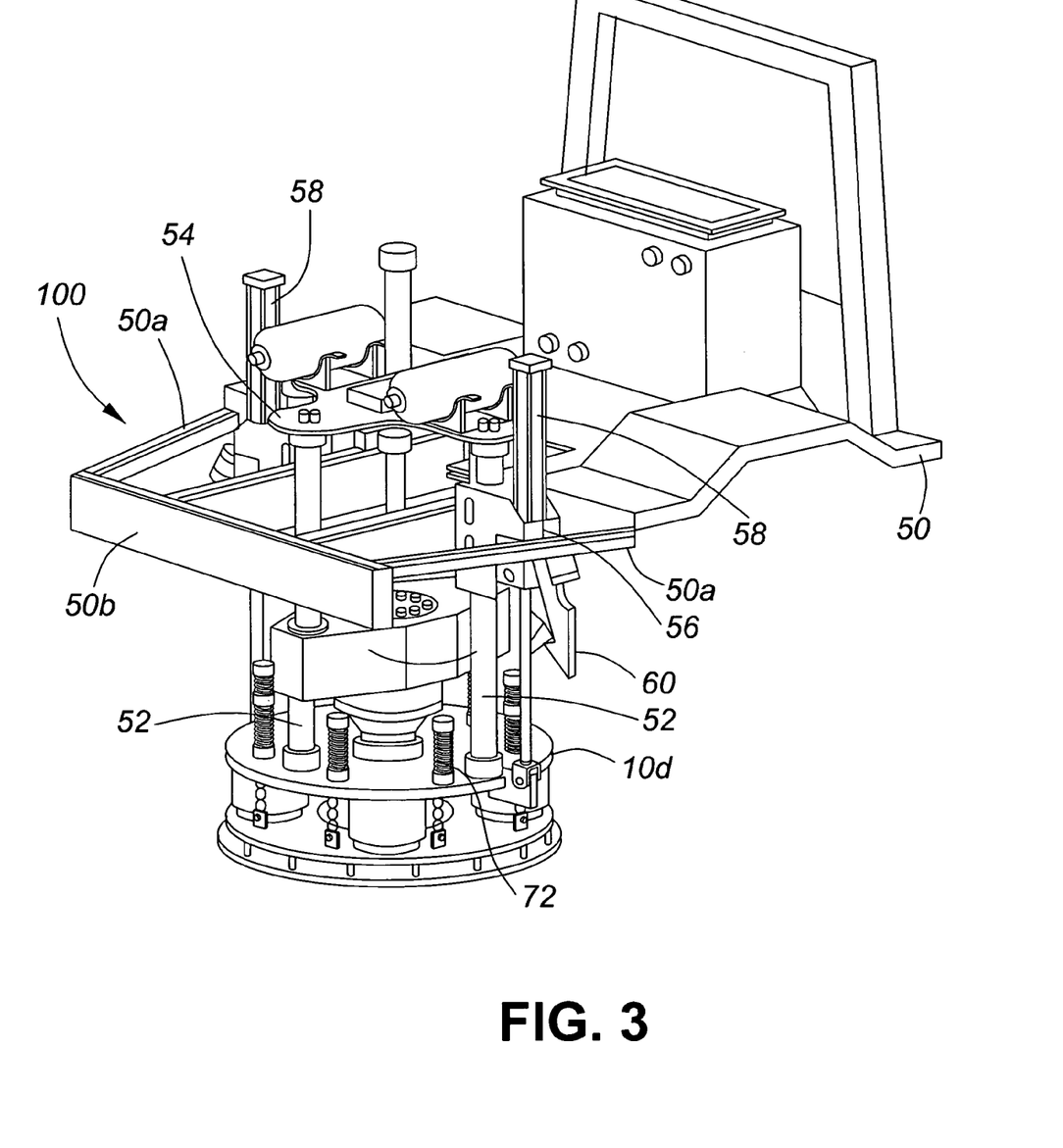
FIG. 3 is an isometric view of an impulse system assembly in accordance with one embodiment of the invention.
Figure 3A:
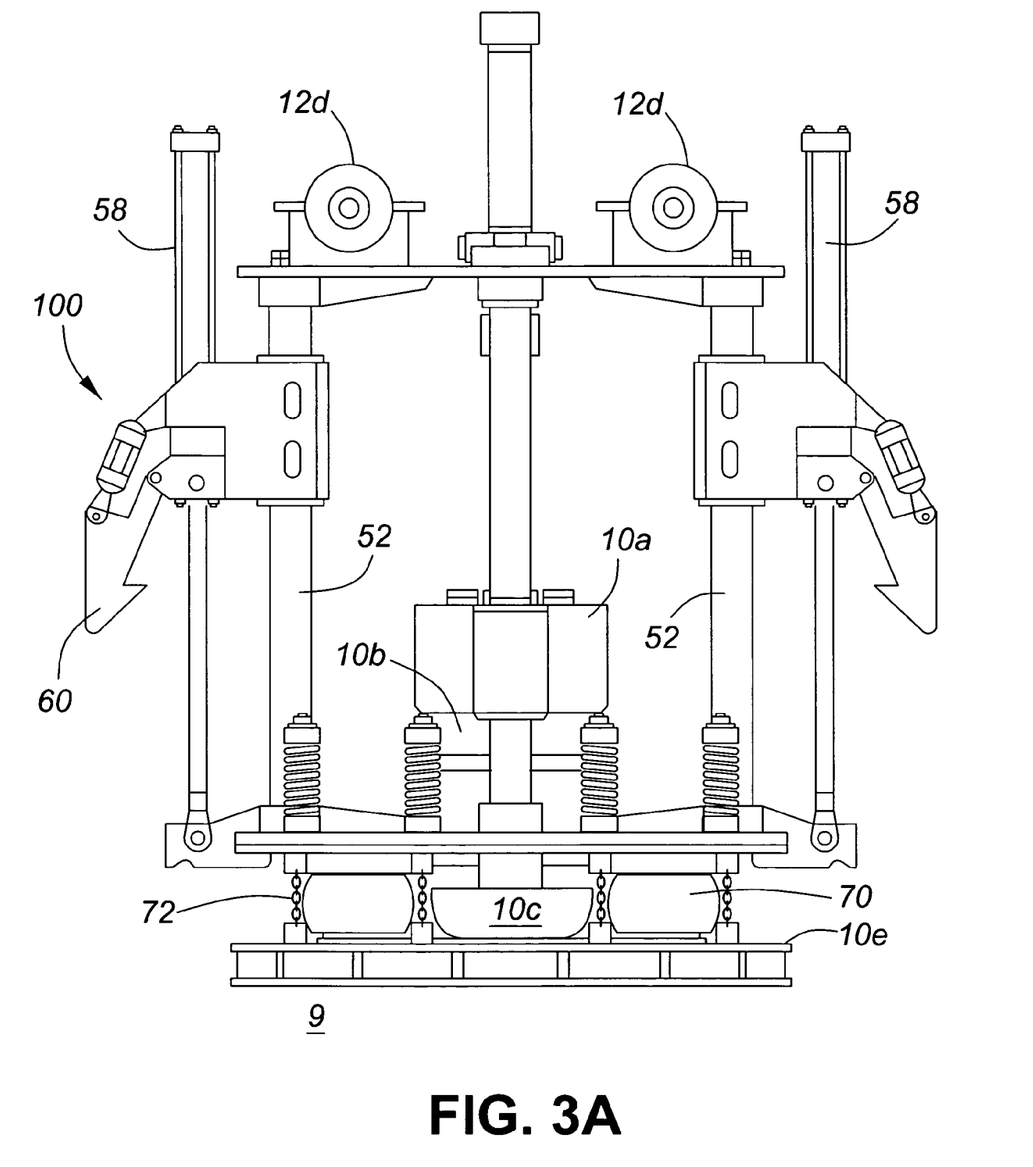
FIG. 3A is a front elevation view of an impulse system assembly in accordance with one embodiment of the invention shown in a deployed position; and, FIG. 3B is a schematic view of an impulse system assembly in accordance with one embodiment of the invention shown in a retracted position.

FIGS. 2, 2A, and 3 are drawings of an impulse system assembly 8a in accordance with a preferred embodiment of the invention that is adapted for configuration to a vehicle 9a. FIG. 3A is a front elevation view of the impulse system assembly in a deployed position and FIG. 3B is a schematic diagram of the impulse system assembly in a retracted position.

As shown, the impulse system assembly includes a vehicle frame assembly 50 for attachment to a vehicle 9a and for supporting the impulse system. In operation, the impulse system assembly is maintained in a retracted position (as shown in FIG. 3B) while the vehicle is in motion and in a deployed position (as shown in FIGS. 2, 2A, 3 and 3A) when it is desired to impart a seismic impulse to the ground.

The vehicle frame assembly 50 includes support members 50a extending to the rear for supporting the impulse system and a rear bumper 50b to protect the system.

Figure 1:
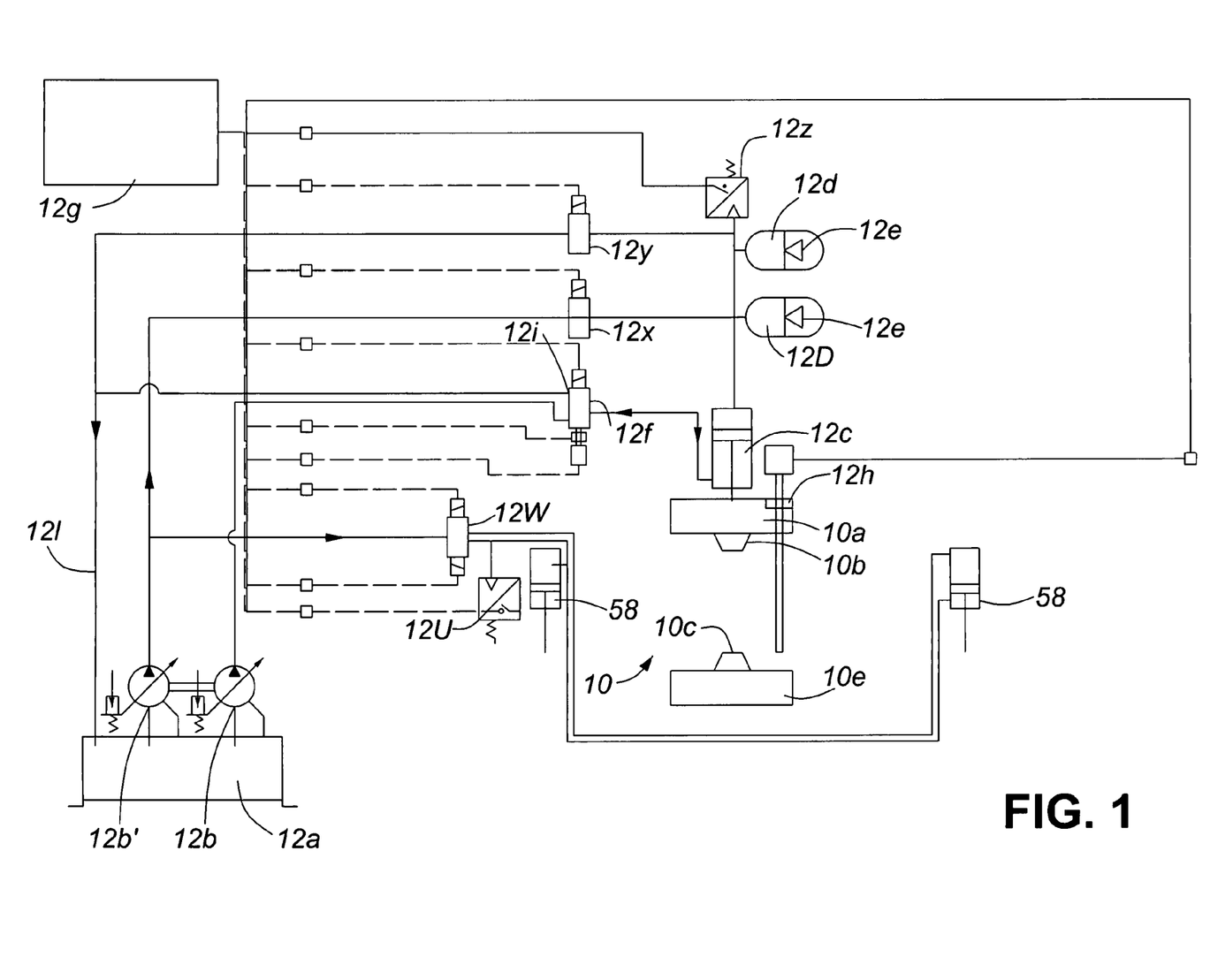
FIG. 1 is a schematic diagram of an impulse system in accordance with the invention.
Figure 3B:
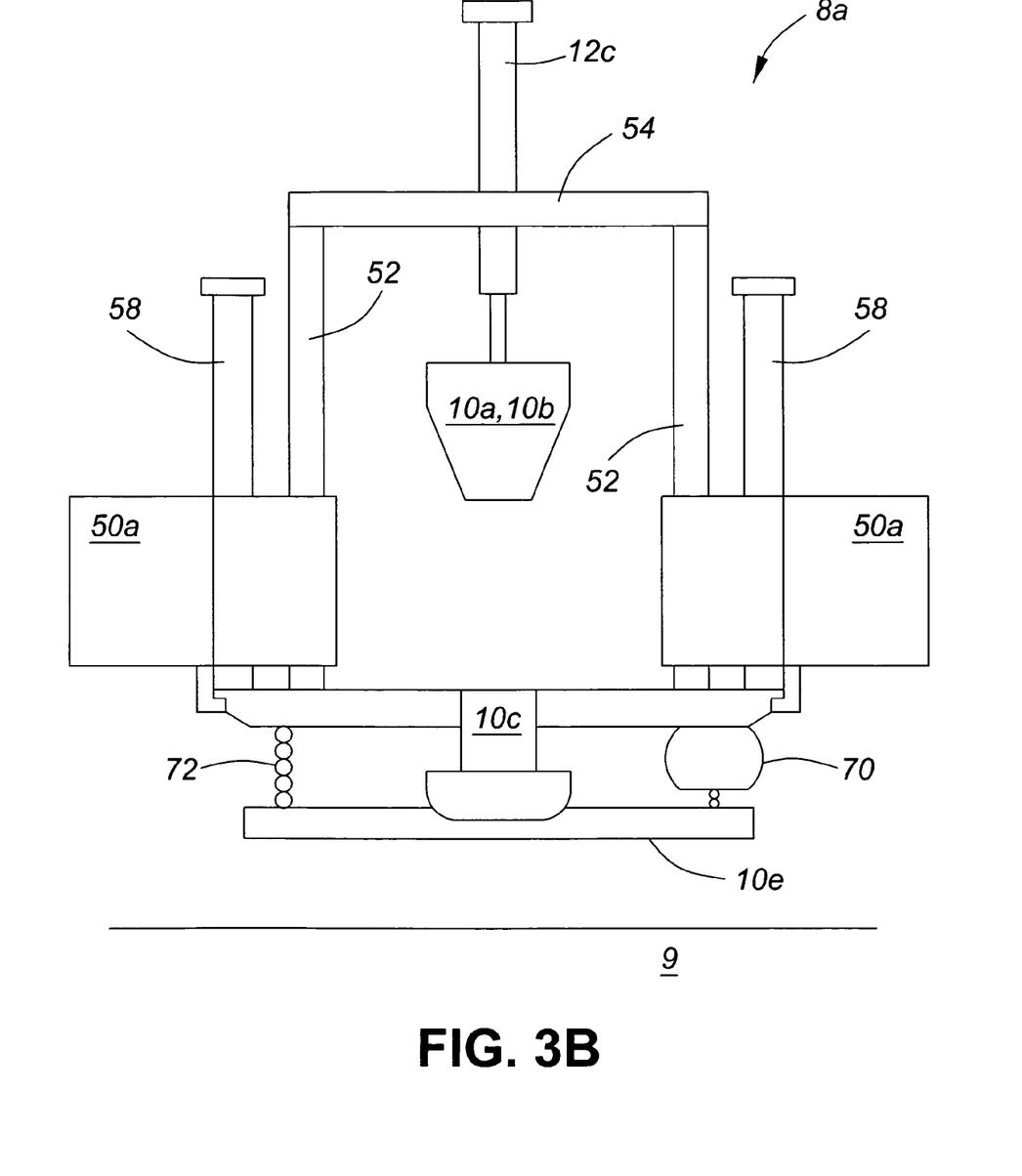

As shown in FIGS. 3A and 3B, the impulse system includes guide columns 52 between a top plate 54 and the intermediate plate 10d that are retained within a collar 56 attached to the support members 50a. The guide columns 52 are housed within the collars 56. A deployment system 58 (preferably hydraulic actuators) are connected between the intermediate plate 10d and support members 50a that is operable to lift and lower the impulse assembly 8 between the retracted and deployed positions. In the retracted position, a latch system 60 (preferably pneumatically actuated) is utilized to actively lock the impulse system in the retracted position. As shown in FIG. 1, lift actuators 58 are hydraulically connected to pump 12b' and reservoir 12a through valve 12w for lifting and lowering the impulse system. Control is provided through pressure switch 12u and electronic control module 12g.

In a preferred embodiment, a series of air bags 70 are located between the baseplate 10e and the intermediate plate 10d and work in conjunction with isolation disks located above and below the intermediate plate 10d to provide an isolating effect between the baseplate 10e and intermediate plate 10d. The air bags 70 assist in minimizing the transmission of vibration and impulse force to the chassis of the vehicle at the moment of impact when the hammer strikes the anvil. A series of chain spring assemblies 72 are attached to the base plate 10e and through the intermediate plate 10d suspending the baseplate in the retracted position and to allow independent movement of the baseplate with respect to the intermediate plate to accommodate for uneven terrain during deployment.

In operation, during a seismic survey, the vehicle operator drives the vehicle to a desired location determined by the requirements of the seismic survey. The operator lowers the impulse assembly 8 to the ground at that desired location and the hammer mass assembly is armed and a predetermined force stroke triggered. The force stroke is repeated as necessary. The operator then lifts the impulse assembly 8 and drives to the next location.

What is claimed is:

1. A system for imparting a mechanical impulse to the earth comprising:
    an anvil for operative deployment against the earth;
    a hammer operatively connected to the anvil for striking the anvil;
    a control system operatively connected to the hammer for controlling the impulse energy of the hammer striking the anvil, the control system including a linear feedback system for measuring the linear position of the hammer with respect to the anvil during a force stroke, a processor for receiving linear position data from the linear feedback system during a force stroke and for controlling the relative speed of the hammer with respect to the anvil during a force stroke through an actuation system so that a predetermined amount of energy is delivered to the anvil as calculated and controlled by the processor during the force stroke.

2. A system as in claim 1 wherein the control system includes:
    a hydraulic actuator operatively connected to the hammer, the hydraulic actuator having a retract side and a pressure side;
    a hydraulic reservoir and hydraulic pump operatively connected to the retract side of the hydraulic actuator, the hydraulic pump for pumping hydraulic fluid from the hydraulic reservoir to the hydraulic actuator;
    a hydraulic accumulator operatively connected to the pressure side of the hydraulic actuator, the hydraulic accumulator having a pressure system for storing hydraulic energy on the pressure side of the hydraulic actuator; and,
    a linear transducer operatively connected to the hammer for measuring the linear position of the hammer with respect to the anvil during a force stroke;
    wherein the actuation system is operatively connected between the hydraulic pump and the retract side of the hydraulic actuator.

3. A system as in claim 2 wherein the pressure system includes a gas filled bladder.

4. A system as in claim 2 wherein the control system includes a charge valve and discharge valve operatively connected to the pressure side of the hydraulic actuator for allowing hydraulic fluid to be pumped to and from the pressure side of the hydraulic actuator.

5. A system as in claim 2 wherein the actuation system includes a servo valve.

6. A system as in claim 2 wherein the hammer includes a mass assembly.

7. A system as in claim 1 further comprising a frame for attachment of the system to a vehicle.

8. A system as in claim 7 further comprising a deployment system for moving the anvil between a retracted position where the anvil is not contacting the ground and a deployed position where the anvil is operatively engaged with the ground.

9. A system as in claim 8 wherein the deployment system includes a latch system for locking the system in the retracted position.

10. A system for imparting a mechanical impulse to the earth comprising:
    an anvil/platen/base plate assembly for operative deployment against the earth;
    a hammer and mass assembly operatively connected to the anvil, the hammer/mass assembly for striking the anvil;

a control system including a servo valve, hydraulic actuator and accumulator assembly interconnected to the hammer/mass assembly for controlling the impulse energy of the hammer/mass assembly striking the anvil/platen/base plate assembly, the control system including a linear feedback loop for measuring the linear velocity and position of the hammer with respect to the anvil during a force stroke, a processor for receiving linear velocity and position data from the linear feedback loop and a proportional integrated derivative (PID) control loop to measure and correct the velocity of the hammer/mass velocity with respect to the anvil during a force stroke so that s predetermined amount of energy is delivered to the anvil as calculated and controlled by the processor during the force stroke.

11. A system as in claim 10 wherein the control system includes:
  a hydraulic actuator operatively connected to the hammer and mass assembly, the hydraulic actuator having a pressure side and a retract side;
  a hydraulic reservoir and first and second hydraulic pumps, the first hydraulic pump operatively connected through a servo control valve to the retract side of the hydraulic actuator, the hydraulic pump for pumping hydraulic fluid from the hydraulic reservoir to the retract side and the second hydraulic pump for pumping hydraulic fluid to the pressure side;
  a hydraulic accumulator operatively connected to the pressure side of the hydraulic actuator, the hydraulic accumulator having a pressure system for storing energy from the hydraulic actuator when hydraulic fluid is pumped to the pressure side of the hydraulic actuator; and,
  a linear transducer operatively connected to the hammer for measuring the linear velocity and position of the hammer with respect to the anvil;
  wherein the actuation system is operatively connected between the hydraulic pump and the retract side of the hydraulic actuator.

12. A system as in claim 11 further comprising a frame for attachment of the system to a vehicle.

13. A system as in claim 11 further comprising a deployment system for moving the anvil/base plate assembly between a retracted position where the anvil/base plate assembly is not contacting the ground and a deployed position where the anvil/base plate assembly is operatively against the ground.

14. A system as in claim 13 wherein the deployment system includes a latch system for locking the system in the retracted position.

15. A system as in claim 14 wherein the anvil/base plate assembly includes a concave platen plate and convex anvil.

16. A system as in claim 14 wherein the mass assembly includes a gimble within the mass/hammer assembly.

17. A system as in claim 14 wherein the control system includes a proportional integrated derivative (PID) control loop for ensuring the repeatability of the force output.

18. A system as in claim 17 wherein the control system includes a monitoring system for tracking the performance of events leading up to and during an impulse cycle.

19. A system as in claim 18 wherein the monitoring system enables records to be downloaded or viewed.

* * * * *